United States Patent [19]
Gehrdes

[11] Patent Number: 5,611,692
[45] Date of Patent: Mar. 18, 1997

[54] SLIP-ON APPARATUS FOR TEACHING HOW TO TIE LACES AND OTHER KNOTS

[76] Inventor: Mary A. Gehrdes, 403 Edgemere Dr., Annapolis, Md. 21403

[21] Appl. No.: 529,651

[22] Filed: Sep. 18, 1995

[51] Int. Cl.⁶ ................................................. G09B 19/24
[52] U.S. Cl. ............................................................ 434/260
[58] Field of Search ................................... 434/260, 258, 434/247; 36/136

[56] References Cited

U.S. PATENT DOCUMENTS

| | | |
|---|---|---|
| D. 143,237 | 12/1945 | Pares . |
| D. 170,563 | 10/1953 | Zipken . |
| D. 221,658 | 8/1971 | Gallagher . |
| 2,180,653 | 11/1939 | Yancey . |
| 2,275,956 | 3/1942 | Brewster . |
| 2,313,874 | 3/1943 | Hume . |
| 2,646,630 | 7/1953 | Miller .................................... 434/260 |
| 3,258,858 | 7/1966 | Cariffe . |
| 4,978,304 | 12/1990 | Alexander ............................. 434/260 |
| 5,240,418 | 8/1993 | Silverman et al. ..................... 434/260 |

Primary Examiner—Gene Mancene
Assistant Examiner—Jeffrey A. Smith

[57] ABSTRACT

A device to slip over any type of shoe or a bare foot that will allow the wearer the opportunity to practice tying shoe laces or any other kind of knot. The expandable sleeve (10A, 10B) is made to look very much like the middle section of a tie shoe, including eyelets (12) to lace through. The lace (14) adds to the teaching purpose since half of the lace is one color or design and the other half is a different color or design.

5 Claims, 1 Drawing Sheet

SLIP-ON APPARATUS FOR TEACHING HOW TO TIE LACES AND OTHER KNOTS

BACKGROUND-FIELD OF THE INVENTION

This invention relates generally to footwear, and more particularly to footwear adapted for instructing a child or someone working in rehabilitation in the skills required to tie shoe laces and other kinds of knots.

BACKGROUND-DESCRIPTION OF PRIOR ART

All children learn how to tie their shoe laces, often on their own. The fine motor skills required are generally developed by age five, and it makes sense that they learn it themselves considering they have been watching people tie shoes for the first four or five years of their lives. At first glance, then, there should be no need for an aid in learning how to do this daily task. The difference, though, is with shoewear like the Velcro® hook-and-loop fastener type for children.

Since the advent of hook-and-loop fastener shoes, many parents have opted for them because they are easier and faster to put on children than tie shoes, and the motor skills required to manipulate the hook-and-loop fastener are generally available to the child at an age as early as two giving the child the independence of taking over that part of their daily dressing needs.

But sooner or later everyone has to learn how to tie their shoes, and the hook-and-loop fastener type cuts down on the opportunities children have to watch the skill performed on their own shoes as well as the opportunity to practice on their own when they decide the time is right for them to learn.

Because of the expandable sleeve, this invention can fit over any type of shoe or even a bare foot. It gives children the apparatus they need to practice the skill and because the apparatus looks like part of a shoe, and fits over the foot to simulate a shoe, once children master the skill using the apparatus, moving on to tie an actual shoe with laces will not feel any different to them.

Sometimes it's difficult to give directions to children when they're learning how to tie shoe laces; they often are just learning the meaning of left and right. With the switching of left and right hands back and forth in the tying process, the invention makes it easier to give instructions by making half of the lace one color, and the other half another color. Children generally have mastered their colors long before they learn their left from their right, so being able to use colors in the giving of instructions makes it easier to learn the skill.

Expandable and slip-on devices have been developed to wear over shoes. Braces for assorted orthopedic uses and sporting uses have been patented in the U.S. None of the patents disclose a method or apparatus to slip over any type of shoe or a bare foot in order to practice tying shoe laces.

Therefore, the principal object of this invention is to provide an apparatus for teaching children how to tie their shoes.

Victims of strokes often have to relearn motor skills, one of which would be tying shoe laces. The advantage of the invention is that it could be used in this respect for the same reasons it appeals to teaching children. It can be slipped on any type of footwear or bare foot, the color of laces can be used to reinforce color recognition and make it easier to give instructions.

OBJECTS AND ADVANTAGES

Accordingly, besides the objects and advantages of the slip-on invention described above, several objects and advantages of the present invention are:

(a) use as a teaching tool for children who don't have a lot of opportunities to practice tying shoe laces;

(b) it will fit any size foot, so can be used by many children over many different shoe sizes;

(c) the different colored laces make it easier to teach the shoe tying process without having to rely on the learner's knowledge of "left" and "right";

(d) recovering stroke victims often need to relearn essential skills like learning to tie shoes and this invention would aid them in relearning the skill;

(e) it can easily be used to practice all sorts of knots and instead of being placed on a foot, it could be placed on a pole for practice in the various knots associated with scouting.

Further objects and advantages of my invention will become apparent from a Consideration of the drawings and ensuing description of it.

SUMMARY OF THE INVENTION

The present invention is directed towards overcoming the problems associated with teaching someone how to tie their shoes. By slipping on a device that lets a person practice tying their shoes, the skill can be mastered with practice.

Additionally, by having a lace of two different colors or designs, directions can be given and followed more easily.

BRIEF DESCRIPTION OF THE DRAWINGS

The accompanying drawings, referred to below and constituting a part of the invention disclosed, illustrate principals and preferred embodiments of the present invention, and together with the description serve to explain the invention.

DETAILED DESCRIPTION OF THE DRAWINGS

Figure 1:
FIG. 1 is a perspective view of the invention on a shod foot.
Figure 2:
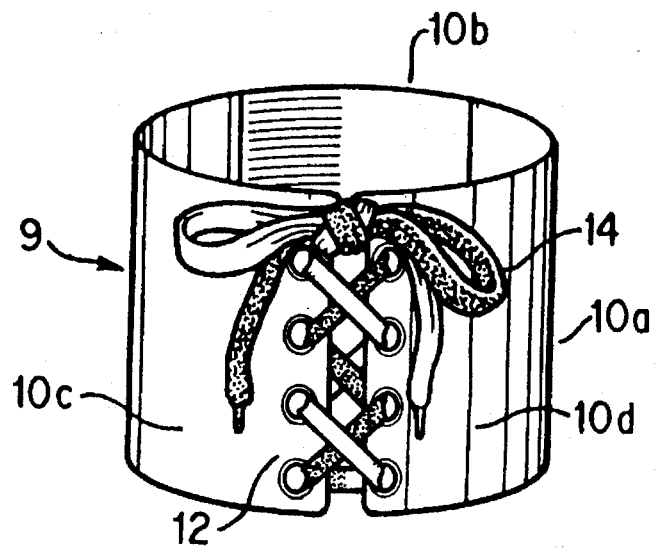
FIG. 2 is a detailed view of the invention.

Referring now to FIGS. 1 and 2, the reference numeral 9 generally indicates the teaching apparatus of this invention. The apparatus is to be worn over a shoe or foot. A sleeve 10A may be preferably constructed from portions 10c, 10d and 10b. Portion 10b is the elastic portion while 10c and 10d are of a flexible material. The number of eyelets 12 allowed does not change the meaning or claims of the invention and the number shown in the drawing does not preclude the invention from having more or less than those indicated. A lace 14 is of two colors, the actual colors implemented not changing the meaning or the claims of the invention, simply that colors or designs are used to differentiate one half of lace from other half.

Although the invention has been disclosed above, with regard to particular and preferred embodiments, these are advanced for illustrative purposes only, and are not intended to limit the scope of this invention.

It is also understood that the following claims are intended to cover all of the generic and specific features of the invention which, as a matter of language, might be said to fall between.

I claim:

1. A training aid for slipping over a foot to demonstrate proper laced shoe tying techniques, said training aid comprising:

(a) a sleeve comprising a first sleeve portion comprising a first edge and a second opposing edge, a second sleeve portion comprising a first edge and a second opposing edge, and an elastic sleeve portion connecting said first portion first edge to said second portion first edge;

(b) lace means for drawing said second edge of said first portion to said second edge of said second portion; and wherein said sleeve further comprises means adjacent each of said first portion second edge and said second portion second edge for receiving said lace means;

whereby the training aid may be positioned over a user's foot and the user may draw said first portion second edge to said second portion second edge to provide the same feeling to the user as would be encountered in tying a real laced shoe.

2. The training aid of claim 1, wherein said lace means comprises at least a first portion having a first design and a second portion having a second, different design.

3. The training aid of claim 2, wherein said first design comprises a first color and said second, different design comprises a second different color.

4. The training aid of claim 1, wherein said receiving means comprises at least one eyelet in each of said first sleeve portion and said second sleeve portion each receiving said lace means therethrough.

5. The training aid of claim 4, wherein said receiving means comprises a plurality of eyelets in each of said first sleeve portion and said second sleeve portion.

* * * * *